United States Patent [19]
Chen

[11] Patent Number: 5,276,941
[45] Date of Patent: Jan. 11, 1994

[54] DEVICE FOR MOUNTING A PAIR OF CASTERS TO A SEGMENT OF A STRUCTURE OF A STROLLER

[76] Inventor: Li C. Chen, No. 9, Alley 2, Lane 606, Sec. 2, Po Ai Rd., Chia Yi City, Taiwan

[21] Appl. No.: 892,747

[22] Filed: Jun. 3, 1992

[51] Int. Cl.⁵ .................... A47B 91/00; B60B 33/00; B60B 37/00
[52] U.S. Cl. .................................. 16/47; 16/30; 16/44
[58] Field of Search ..................... 16/47, 30, 44

[56] References Cited
U.S. PATENT DOCUMENTS

| | | | |
|---|---|---|---|
| 4,731,899 | 3/1988 | Huang | 16/44 |
| 4,759,098 | 7/1988 | Ko | 16/47 |
| 4,847,945 | 7/1989 | Schwartz et al. | 16/30 |
| 4,969,230 | 11/1990 | Huang | 16/30 |

Primary Examiner—John Sipos
Assistant Examiner—Carmine Cuda
Attorney, Agent, or Firm—Bacon & Thomas

[57] ABSTRACT

The present invention provides a device for mounting a pair of casters to a tubular segment of a structure of a stroller. The mounting device consists of a first sleeve, a second sleeve and a cushion. Generally, the first sleeve is securely attached to a tubular segment of a structure of a stroller by means of a rivet or the like. The second sleeve pivotally receives the first sleeve, thereby permitting them to rotate relative to each other. The cushion consists of a cap-like element, a spring and a plug. The cap-like element has two slots longitudinally extending therein. The plug has a hole transversely extending therethrough. The cap-like element is securely connected with the second sleeve. The spring is received in the cap-like element. The plug is also received in the cap-like element. A shaft on which a pair of casters rotate is inserted through the slots in the cap-like element and the hole of the plug, whereby the spring is sandwiched-between the top in the cap-like element and the plug.

7 Claims, 3 Drawing Sheets

DEVICE FOR MOUNTING A PAIR OF CASTERS TO A SEGMENT OF A STRUCTURE OF A STROLLER

BACKGROUND OF THE INVENTION

The present invention relates to a device for mounting a pair of casters to a segment of a structure of a stroller and, more particularly, to a mounting device which cushions the stroller and enables the direction of the stroller's motion to be changed.

Generally, a structure of a stroller has four vertical or declined segments 2 each having a tubular configuration as shown in FIG. 1. Four shafts 3 are each mounted to each tubular segment 2. Four pairs of casters 4 are each mounted rotatably on each shaft 3. For easily changing the direction of the stroller's motion, it is preferable to mount each shaft 3 to each tubular segment 2 by means of a mounting device instead of directly mounting each shaft 3 to the tubular segments 2. A conventional mounting device 6 is shown in a partially cross-sectional view in FIG. 1. Each tubular segment 2 has two aligned holes near a lower end thereof. The mounting device 6 has a first sleeve 8 defining two aligned holes near an upper end thereof. A rivet or the like is inserted through the holes of the first sleeve 8 and of the tubular segment 2, thereby securely attaching the first sleeve 8 to the tubular segment 2. Below the holes, an annular flange 10 extends on the first sleeve 8. Below the flange 10, two flexible strips 12 longitudinally extend upwards from the first sleeve 8. Each flexible strip 12 has a free end transversely extending therefrom. The mounting device 6 further has a second sleeve 14. Near an upper end, the second sleeve 14 defines two slots 16 corresponding to the flexible strips 12. To assemble the mounting device 6, the first sleeve 8 is inserted into the second sleeve 14 until the free ends of the flexible strips 12 contact an upper rim of the second sleeve 14. The free ends of the flexible strips 12 are urged towards an axis of the first sleeve 8. Thus, the first sleeve 8 is permitted to be further inserted into the second sleeve 14 until the annular flange 10 contacts the upper rim of the second sleeve 14 and the free ends of the flexible strips 12 are received in the slots 16. As a result, the first sleeve 8 is restrained from moving upwards or downwards relative to the second sleeve 14. However, the second sleeve 14 can be rotated relative to the first sleeve 8, i.e., relative to the tubular segment 2. Then, the shaft 3 is mounted to the second sleeve 14 below the slots 16. As indicated by two arrows in FIG. 1, the flexible strips 12 can be urged towards the axis of the first sleeve 8 to thereby permit the first sleeve 8 to be disengaged from the second sleeve 14. A major problem of such a conventional mounting device 6 is the difficulty in biasing the flexible strips 12 in order to disengage the first sleeve 8 from the second sleeve 14 because the slots 16 are too small for human fingers to enter. Therefore, the present invention is intended to solve the above-mentioned problem. Moreover, the present invention is adapted for cushioning the stroller.

SUMMARY OF THE INVENTION

The present invention provides a device for mounting a pair of casters to a tubular segment of a structure of a stroller. The mounting device consists of a first sleeve, a second sleeve and a cushion. Generally, the first sleeve is securely attached to a tubular segment of a structure of a stroller by means of a rivet or the like. The second sleeve pivotally receives the first sleeve, thereby permitting them to rotate relative to each other. The cushion consists of a cap like element, a spring and a plug. The cap-like element has two slots longitudinally extending therein. The plug has a hole transversely extending therethrough. The cap-like element is securely connected with the second sleeve. The spring is received in the cap-like element. The plug is also received in the cap-like element. A shaft on which a pair of casters rotate is inserted through the slots of the cap-like element and the hole in the plug, whereby the spring is sandwiched between the top of the cap-like element and the plug.

For a complete understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
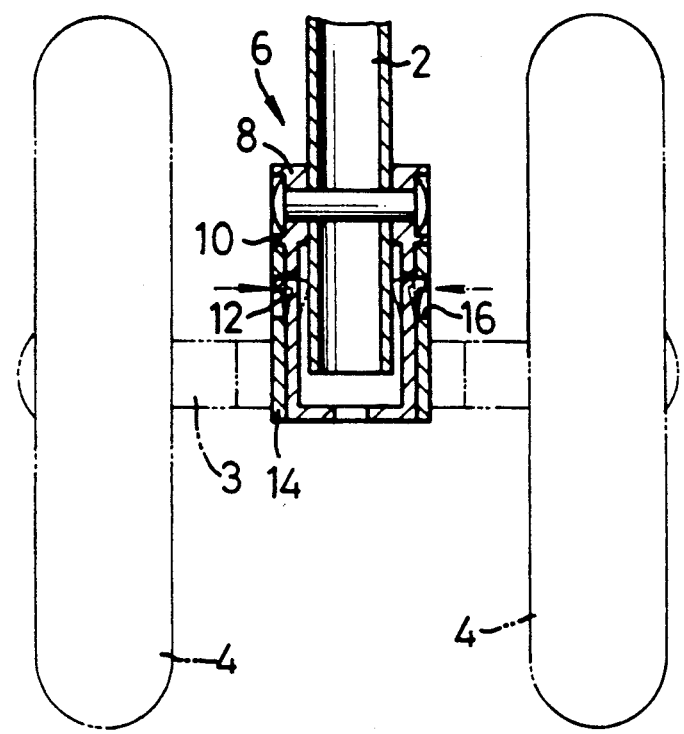
FIG. 1 is a partially cross-sectional view of a device for mounting a pair of casters to a segment of a structure of a stroller in accordance with prior art.
Figure 2:
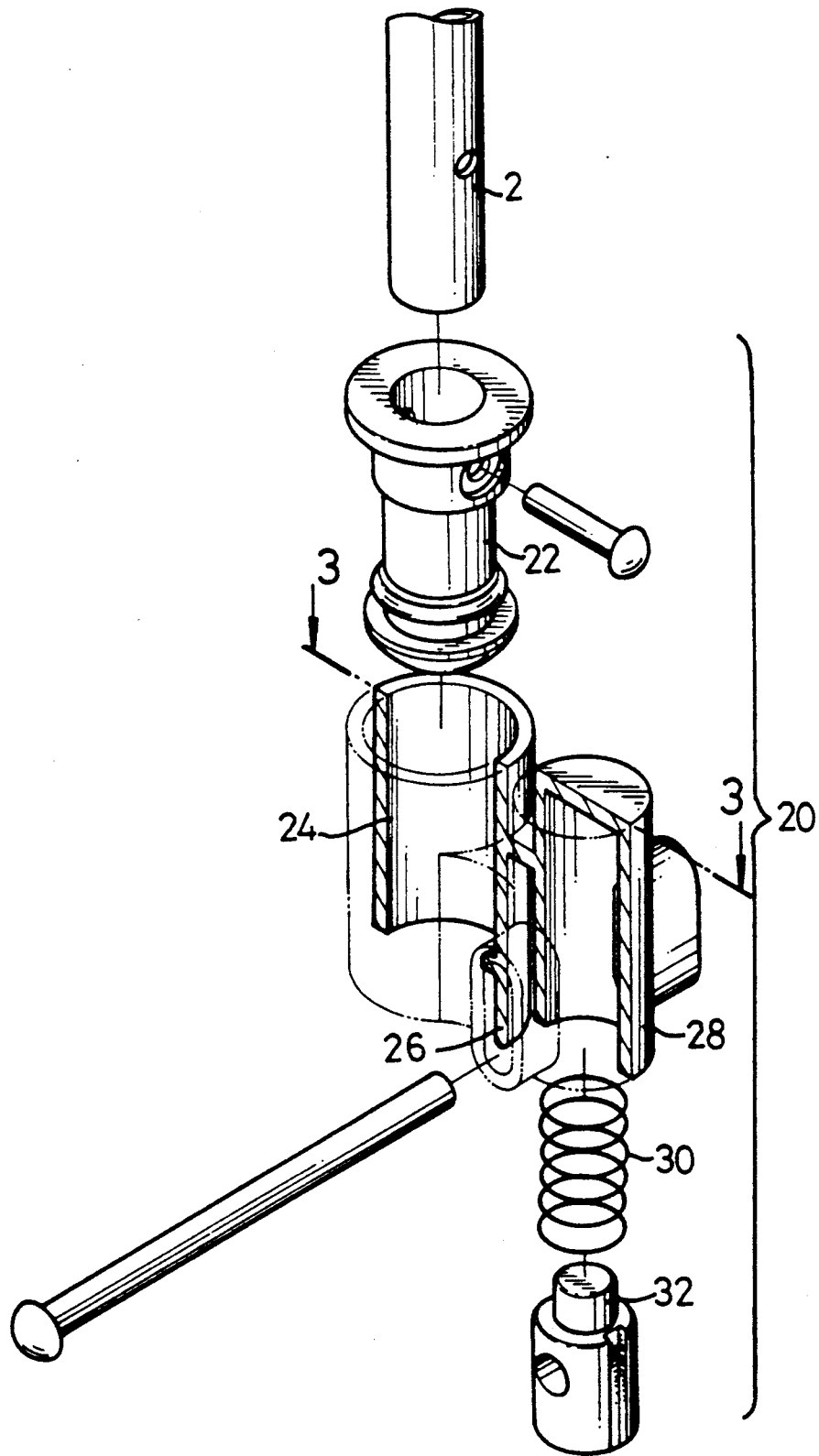
FIG. 2 is an exploded view of a device for mounting a pair of casters to a segment of a structure of a stroller in accordance with the present invention.

Referring to the drawings and, more particularly, to FIG. 2, a tubular segment 2 of a structure of a stroller has two opposite holes near a lower end thereof. In accordance with the preferred embodiment of the present invention, a device 20 for mounting a pair of casters to a segment of a structure of a stroller is shown in an exploded view.

A first sleeve 22 has a first annular flange extending along an upper rim thereof. Below the first annular flange, two countersinks are formed in the first sleeve 22. A rivet is inserted through the countersinks of the first sleeve 22 and the holes of the tubular segment 2 to thereby securely attach the first sleeve 22 to the tubular segment 2. A second annular flange extends along a lower rim of the first sleeve 22. The second annular flange is tapered downwards, thereby forming a conical surface.

A second sleeve 24 defines a flexible buckle 26 longitudinally extending downwards from a lower portion thereof. A rectilinear protrusion transversely extends on the flexible buckle 26 so as to face an axis of the second sleeve 24.

A cushion consists of a cap-like element 28, a spring 30 and a plug 32. The cap-like element 28 defines a top and a periphery extending around the top. The periphery of the cap-like element 28 has two slots longitudinally extending therein and aligning with each other. It is preferable that a flange extends around each slot. The plug 32 has a discrete configuration, i.e., it consists of a slender upper section and a thick lower section. A hole transversely extends through the thick lower section of the plug 32.

Figure 3:
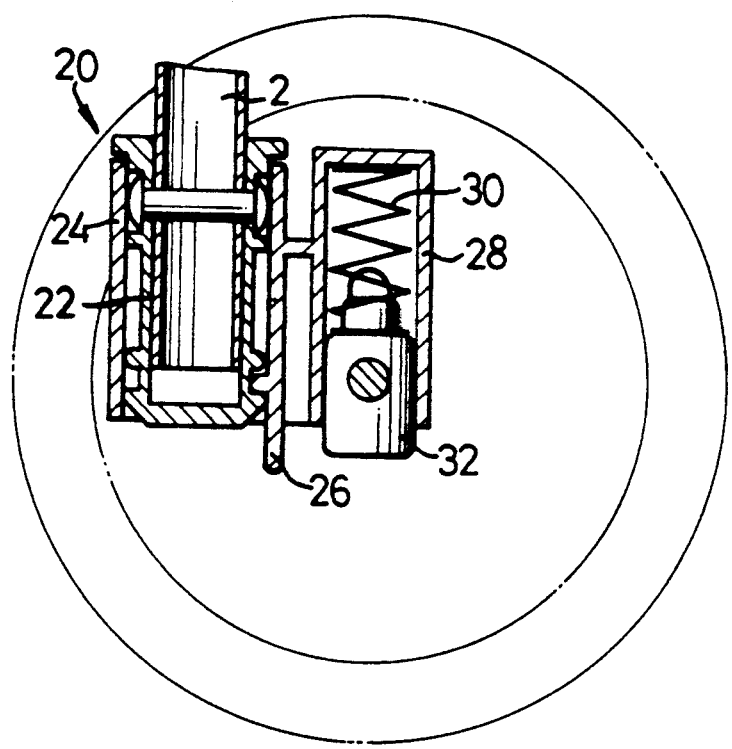
FIG. 3 is a partially cross-sectional view of a device for mounting a pair of casters to a segment of a structure of a stroller in accordance with the present invention.

Further referring to FIG. 3, to assemble the mounting device 20, the first sleeve 22 is first inserted into the second sleeve 24. Later, the conical surface of the second annular flange of the first sleeve 22 contacts the rectilinear protrusion of the flexible buckle 26. As the first sleeve 22 is apt to move into the second sleeve 24, the conical surface of the second flange of the first sleeve 22 urges the flexible buckle 26 away from the first sleeve 22. Thus, the first sleeve 22 is permitted to be further inserted into the second sleeve 24 until the first annular flange of the first sleeve 22 contacts an upper rim of the second sleeve 24 and the second annular flange of the first sleeve 22 is retained below the rectilinear protrusion of the flexible buckle 26. At the moment when the second annular flange of the first sleeve 22 is moved below the wedge of the locking flexible buckle 26, the flexible buckle 26 recovers to it's original position. In such a position, a horizontal upper surface of the second annular flange of the first sleeve 22 is against the rectilinear protrusion of the flexible buckle 26. Thus, the first sleeve 22 is permitted from moving upwards relative to the second sleeve 24 as the second annular flange of the first sleeve 22 is stopped by the rectilinear protrusion of the flexible buckle 26. Nor can the first sleeve 22 be removed downwards relative to the second sleeve 24 as the upper annular flange of the first sleeve 22 abuts the upper rim of the second sleeve 24. However, the first sleeve 22 is permitted to rotate relative to the second sleeve 24.

The spring 30 is received in the cap-like element 28, so that an upper end of the spring 30 contacts the top of the cap-like element 28. The plug 32 is also received in the cap-like element 28 with the slender upper section received in the spring 30. A shaft 3 is inserted through the slots in the cap-like element 28 and the hole in the thick lower section of the plug 32, so that the spring 30 is disposed between the top of the cap-like element 28 and the thick section of the plug 32. A pair of casters 4 are mounted on the shaft 3.

Consequently, the mounting device 20 helps change the direction of the stroller on the casters 4. Moreover, the mounting device 20 helps cushion the stroller.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A device for mounting a pair of casters to a segment of a stroller structure comprising:
    a) a first sleeve securely attached to a segment of a stroller structure, the first sleeve including upper and lower annular flanges:
    b) a second sleeve for pivotally receiving the first sleeve and for restraining the first sleeve from diverging from the second sleeve, the second sleeve including an upper circular rim and a flexible longitudinal buckle, the upper circular rim supporting the upper annular flange and the flexible buckle detachably locking the lower annular flange, whereby the first sleeve is restrained from diverging from the second sleeve; and,
    c) a cushion respectively connected with said second sleeve and with a shaft on which a pair of casters rotate.

2. A device in accordance with claim 1 wherein (A) said first sleeve comprises two countersinks corresponding to two holes of the segment and (B) a rivet is insertable through said countersinks of said first sleeve and the holes of the segment, thereby securely attaching said first sleeve to the segment.

3. A device in accordance with claim 1 wherein (A) said lower annular flange is tapered downwards to thereby form a conical surface, (B) said flexible buckle has a protrusion transversely extending thereon, (C) said conical surface urges said flexible buckle away therefrom to thereby permit said lower annular flange to pass said protrusion and (D) at the moment when said lower annular flange is below said protrusion, said flexible buckle recovers to it's original position where said protrusion is against said lower annular flange, thereby restraining said first sleeve from moving upwards relative to said second sleeve.

4. A device in accordance with claim 1 wherein said cushion comprises:
    a cap-like element securely connected with said second sleeve;
    a spring received in said cap-like element; and
    a plug slidably received in said cap-like element to thereby compress said spring between said cap-like element and said plug;
    the shaft attached to said plug, whereby the stroller is cushioned.

5. A device in accordance with claim 4 wherein said cap-like element has two opposite longitudinal slots.

6. A device in accordance with claim 5 wherein said plug has integral slender upper and thick lower sections, said spring encloses said slender upper section and is compressed between said cap-like element and said thick lower section.

7. A device in accordance with claim 6 wherein said plug has a transverse through hole, the shaft extends through said opposite longitudinal slots and said through hole.

* * * * *